United States Patent Office 3,062,756
Patented Nov. 6, 1962

3,062,756
METHOD OF POLYMERIZING DIAZOMETHANE
Charles C. Clark, Kenmore, N.Y., assignor to Olin Mathieson Chemical Corporation, a corporation of Virginia
No Drawing. Filed July 18, 1960, Ser. No. 43,681
10 Claims. (Cl. 260—2)

This invention relates to solid, high tensile strength polymethylene. More particularly, the invention relates to solid polymers of polymethylene obtained by contacting an ether solution of diazomethane with a catalyst selected from the group consisting of an alkali metal borohydride or a carborane of the formula $B_{10}H_{10}(CRCR')$, wherein R and R' are hydrogen or alkyl groups.

In the past, solid polymethylene having the formula $(CH_2)_x$ and having molecular weights ranging from about 1800 to 22,000 has been obtained by contacting diazomethane with, for example, alkyl boron esters or copper powder as described by H. Meerwein, Angew, Chem. 60, 78 (1948); G. Buckley et al., J. Chem. Soc. 1950, 2714; and I. Harris, J. Polymer Science 8, 535 (1952). The products obtained by the methods described in the references cited were brittle, of relatively low molecular weight and, in addition, the yields obtained using these methods were very low.

Surprisingly it has been discovered that valuable solid polymers of polymethylene can be obtained in high yields by contacting and decomposing diazomethane in a lower dialkyl ether solution with a catalytic quantity of a compound selected from the group consisting of an alkali metal borohydride, or a carborane of the formula $B_{10}H_{10}(CRCR')$ wherein R and R' are hydrogen or alkyl groups having from 1 to 5 carbon atoms. Carborane compounds of the formula $B_{10}H_{10}(CRCR')$ can be conveniently prepared in the manner described in pending John W. Ager et al. application Serial No. 813,032, filed May 13, 1959, by reacting decaborane with an acetylenic hydrocarbon containing 2 to 10 carbon atoms in the presence of a wide variety of ethers, nitriles, amines, or sulfides. For example, the compound $B_{10}H_{10}(CHCH)$ can be prepared by reacting decaborane, diethyl sulfide and acetylene in an autoclave at 140° C. for about 3 hours. Suitable alkali metal borohydrides include, for example, sodium borohydride, potassium borohydride and lithium borohydride. Dialkyl ethers which can be employed in the process of this invention include, for example, dimethyl ether, diethyl ether, methyl ethyl ether, di-isopropyl ether and di-n-butyl ether.

A number of methods are known to the art for the preparation of diazomethane and in the practice of this invention any method preferred may be employed. Since diazomethane is known to be explosive under certain conditions it is preferred in this invention to work with a solution of diazomethane in a lower dialkyl ether such as diethyl ether.

In carrying out the process of this invention the diazomethane utilized can be conveniently prepared by reacting N,N'-dinitroso-N,N'-dimethylterephthalamide with sodium hydroxide while the reactants are in admixture with a lower dialkyl ether containing a small amount of ethanol. The diazomethane so formed in the reaction is distilled from the generator along with the ether, passed through a condenser and the yellow solution of diazomethane dissolved in the ether collected in a receiver maintained at 0° C. The polymerization reaction is extremely simple to carry out since it is only necessary to add a catalytic quantity of the boron compound to the ether solution of diazomethane to cause the diazomethane dissolved in the ether to decompose and polymerize rapidly to a white, flocculent precipitate accompanied by a rapid, smooth evolution of nitrogen. The temperature of the polymerization reaction may be varied from about −30° C. to +30° C., with a preferred temperature being −10° C. to about +25° C. With sodium borohydride the addition of a catalytic quantity without mixing is sufficient to cause the instantaneous formation of the solid polymer of polymethylene at practically quantitative yields. With carborane as a catalyst the polymerization begins after about 5 minutes and is complete in about 30 minutes. In practice, stirring or mixing may be desirable during the polymerization process in order to control the reaction. Generally, the amount of the boron compound added will be between about 0.01 gram and about 0.00001 gram per gram of diazomethane present in the ether solution with the preferred amount being from about 0.005 to about 0.00005 gram per gram of diazomethane present in the ether solution. The concentration of the diazomethane in the ether is not critical and it may be varied widely from about 0.25 to 10 percent by weight, based on the total weight of the solution. The following examples illustrate various embodiments of this invention and are to be considered as not limitative.

*Example I*

The diazomethane generating apparatus consisted of a 500 ml. Erlenmeyer flask connected to a Liebig condenser positioned for distillation. A 250 ml. Erlenmeyer flask which served as a receiver was connected to the lower end of the condenser by means of a glass tube which extended to the bottom of the receiver. The receiver was also provided with a vent tube. The connections to the two Erlenmeyer flasks were made through rubber stoppers and the connecting tubing employed was glass with fire-polished ends.

A total of 60 ml. of a 40 percent solution of aqueous sodium hydroxide was added to the generator flask followed by the addition of 200 ml. of diethyl ether and 6 ml. of ethanol. The ethanol was added to prevent foaming and to decrease the danger of explosion. Then stirring with the magnetic stirrer was commenced and the mixture was cooled to 0° C. by means of an ice-bath. In the next step 7.1 grams of N,N'-dinitroso-N,N'-dimethylterephthalamide was slowly added to the caustic soda-diethyl ether-ethanol mixture at 0° C. On completing this addition, the generator was connected to the remainder of the system and a large evaporating dish was positioned about the lower part of the generator. Warm water (about 55° C.) was slowly added to the evaporating dish to initiate and maintain the reaction. The diazomethane formed along with diethyl ether distilled over and was collected at 0° C. in the receiver as a yellow solution. This operation was continued until virtually no yellow color remained in the generator. About 70 minutes were required for the completion of the reaction.

At the conclusion of the diazomethane generation period about 180 ml. of ether containing approximately 0.5 gram of dissolved diazomethane was present in the receiver.

The solution of diazomethane and diethyl ether so obtained was divided into two equal parts and to the first part a few particles of sodium hydride were added at room temperature. No polymer was formed during a three hour period. To the second part, a crystal of carborane, $B_{10}H_{10}(CHCH)$ (about 0.001 g.), prepared in the manner described in pending John W. Ager, Jr., et al. application Serial No. 813,032, filed May 13, 1959, was added. Polymerization began after five minutes and was substantially complete at the end of ½ hour. During the polymerization process nitrogen was evolved. The white, opaque, flocculent polymethylene, which precipitated from the diazomethane-ether solution was collected on a fritted-glass filter funnel. After being washed with diethyl ether, the white polymer was air dried. The dry polymer, which formed a sheet on the suction filter, exhibited a fiber structure when torn. Polymethylene in the amount of 0.170 gram was obtained in this experiment. Analysis of the polymethylene so produced for carbon and hydrogen by conventional methods showed that it consisted almost entirely of these two elements.

*Example II*

In this example about 180 ml. of diethyl ether containing approximately 0.5 gram of dissolved diazomethane was obtained in the same manner as described in Example I by first reacting 7.1 grams of N,N'-dinitroso-N,N'-dimethylterephthalamide with 60 ml. of a 40 percent solution of aqueous sodium hydroxide in 200 ml. of diethyl ether together with 6 ml. of ethanol and then distilling the diazomethane and ether from the reaction flask. The apparatus used was the same as described in Example I.

To the solution of diazomethane and diethyl ether so obtained a small crystal of sodium borohydride (about 0.001 gram) was added at room temperature. Instantaneously a white, flocculent precipitate of solid polymethylene polymer was formed. The polymer was collected on a fritted-glass, filter funnel, washed with diethyl ether, and air dried. An amount of 0.439 gram of white, opaque polymethylene was obtained. Polymethylene obtained in this example was analyzed by conventional methods for carbon and hydrogen and found to consist almost entirely of these two elements.

The valuable, polymethylene polymer obtained by the process of this invention is suitable for the production of film and sheeting and for injection molding. In addition, it can be heat sealed. It is extremely tough and has a high solvent resistance. The polymer produced by the process of this invention is insoluble in boiling carbon tetrachloride, carbon disulfide, acetone, diethylformamide, benzene and water. Hot, concentrated hydrochloric and nitric acids and hot, concentrated caustic soda do not attack the polymer. The softening point of the polymethylene produced by the process of this invention is about 130–140° C.

What is claimed is:

1. A method for preparing solid polymeric polymethylene which comprises contacting diazomethane in solution in a lower dialkyl ether with a catalyst selected from the group consisting of alkali metal borohydrides and carborane compounds of the formula $B_{10}H_{10}(CRCR')$ where R and R' are selected from the group consisting of hydrogen and alkyl radicals having from 1 to 5 carbon atoms.

2. The method of claim 1 wherein the catalyst is $$B_{10}H_{10}(CHCH)$$

3. The method of claim 1 wherein the catalyst is sodium borohydride.

4. The method of claim 1 wherein the lower dialkyl ether is diethyl ether.

5. A method for the preparation of solid polymeric polymethylene which comprises contacting diazomethane in solution in a lower dialkyl ether with a catalyst selected from the group consisting of alkali metal borohydrides and carborane compounds of the formula $$B_{10}H_{10}(CRCR')$$

where R and R' are selected from the group consisting of hydrogen and alkyl radicals having from 1 to 5 carbon atoms, said catalyst being present in an amount from 0.001 percent to about 1.0 percent by weight based on the weight of the diazomethane contained in the ether solution.

6. The method of claim 5 wherein the catalyst is $$B_{10}H_{10}(CHCH)$$

7. The method of claim 5 wherein the catalyst is sodium borohydride.

8. The method of claim 5 wherein the lower dialkyl ether is diethyl ether.

9. A method for the preparation of solid polymeric polymethylene which comprises contacting diazomethane in solution in diethyl ether with $B_{10}H_{10}(CHCH)$, said $B_{10}H_{10}(CHCH)$ being present in an amount from 0.001 percent to about 1.0 percent by weight based on the weight of the diazomethane contained in the ether solution.

10. A method for the preparation of solid polymeric polymethylene which comprises contacting diazomethane in solution in diethylether with sodium borohydride, said sodium borohydride being present in an amount from 0.001 percent to about 1.0 percent by weight based on the weight of the diazomethane contained in the ether solution.

References Cited in the file of this patent

UNITED STATES PATENTS

| | | |
|---|---|---|
| 2,671,767 | Buckley et al. | Mar. 9, 1954 |
| 2,717,889 | Feller et al. | Sept. 13, 1955 |
| 2,728,758 | Field et al. | Dec. 27, 1955 |

OTHER REFERENCES

Saini et al.: "Gazzetta Chimica Italiana" 87, pp. 342–353 (1957).